United States Patent [19]

Jelinek

[11] 4,300,773
[45] Nov. 17, 1981

[54] SEALING DEVICE

[75] Inventor: Jerry G. Jelinek, La Habra, Calif.

[73] Assignee: Parker-Hannifin Corporation, Cleveland, Ohio

[21] Appl. No.: 185,112

[22] Filed: Sep. 8, 1980

Related U.S. Application Data

[63] Continuation of Ser. No. 884,662, Mar. 8, 1978, abandoned.

[51] Int. Cl.$^3$ .............................................. F16J 15/06
[52] U.S. Cl. ..................................... 277/11; 277/180
[58] Field of Search ............ 277/207 A, DIG. 2, 180, 277/9, 11, 152, 153

[56] References Cited

U.S. PATENT DOCUMENTS

| | | | |
|---|---|---|---|
| 2,200,688 | 5/1940 | Bridgers | 277/11 |
| 3,170,701 | 2/1965 | Hoover | 277/180 |
| 3,664,672 | 5/1972 | Petersen | 277/235 B |
| 4,256,313 | 3/1981 | Arnold | 277/11 |

FOREIGN PATENT DOCUMENTS 836197 6/1960 United Kingdom ................ 277/180

*Primary Examiner*—Robert I. Smith
*Attorney, Agent, or Firm*—Joseph B. Balazs

[57] ABSTRACT

A sealing device that is self-centering on a cylindrical part about which it is to be disposed is disclosed. The device is comprised of a metal plate and an elastomeric sealing member that is bonded to an aperture provided in the plate. The sealing member has an annular sealing portion with a radially inwardly extending spacer portion of reduced axial thickness and having an inner diameter slightly smaller than the diameter of the cylindrical part about which the sealing device is to be disposed. The elastomeric material is readily deformable and therefore the spacer portion of the sealing member will not mar or scratch the cylindrical part when mounted thereon. The spacer portion is sufficiently thick so that when the cylindrical part is inserted through the spacer portion and deforms the same to a larger inner diameter, the spacer portion will grip the cylindrical part and be sufficiently rigid so as to center the sealing portion radially about the part. In addition, the gripping force of the spacer portion on the cylindrical part is such that the sealing device can be manually rotated to a desired angular position relative to the part and will maintain the position when the part and sealing device are assembled to another part.

5 Claims, 4 Drawing Figures

SEALING DEVICE

This is a continuation, of application Ser. No. 884,662, filed Mar. 8, 1978 and now abandoned.

BACKGROUND OF THE INVENTION

1. Field of the Invention

This invention relates to a sealing device for sealing between two parts to be joined and more particularly to a self-centering sealing device which can be pre-located on a surface on one of the parts without marring the finish on same, and when so located, will maintain its radial and angular alignment on the surface when such part is being assembled to the other part.

2. Description of the Prior Art

Parts to be joined by a gasket or other sealing device therebetween sometimes have holes in the parts and the sealing device to receive bolts for joining the parts together. In addition, the parts and the sealing device may have other openings through which fluid is to pass. In either case, the sealing device must be positioned between the parts so that the sealing surfaces of the device and the parts are in radial alignment and so that the bolt holes and fluid passage openings are properly radially and anguarly aligned. Obtaining such radial and angular alignment and maintaining such alignment during assembly has proven to be a problem with prior art seals. Because of this it has become desirable to develop a sealing device which firmly grips the surface about which it is disposed so as to be self-centering thereon resulting in radial alignment of the device with respect to the parts being joined and which permits and maintains angular alignment of the device relative to the parts being joined during assembly of same.

SUMMARY OF THE INVENTION

The present invention discloses a sealing device that may be pre-located over a cylindrical projection on a part that is to be joined to another part. The device comprises a metal plate having a central aperture about whose periphery an elastomeric sealing member is bonded. The elastomeric member has a sealing portion for sealing the transverse faces of the parts to be joined and an annular spacer portion projecting radially inwardly of the sealing portion. The inner diameter of the spacer portion is initially slightly smaller than the diameter of the cylindrical projection so that when the sealing device is positioned on the projection, the spacer portion grips the projection but is still manually slidable and rotatable thereon. The spacer portion is sufficiently rigid so that it will center the sealing device radially about the cylindrical projection and maintain the device in a selected angular position thereon with the other openings in the device in alignment with corresponding other openings in the two parts during the joining of same. Because the spacer portion is formed of soft and pliable elastomeric material, it will not mar or scratch the cylindrical projection when positioned thereon.

DESCRIPTION OF THE PREFERRED EMBODIMENT

Figure 1:
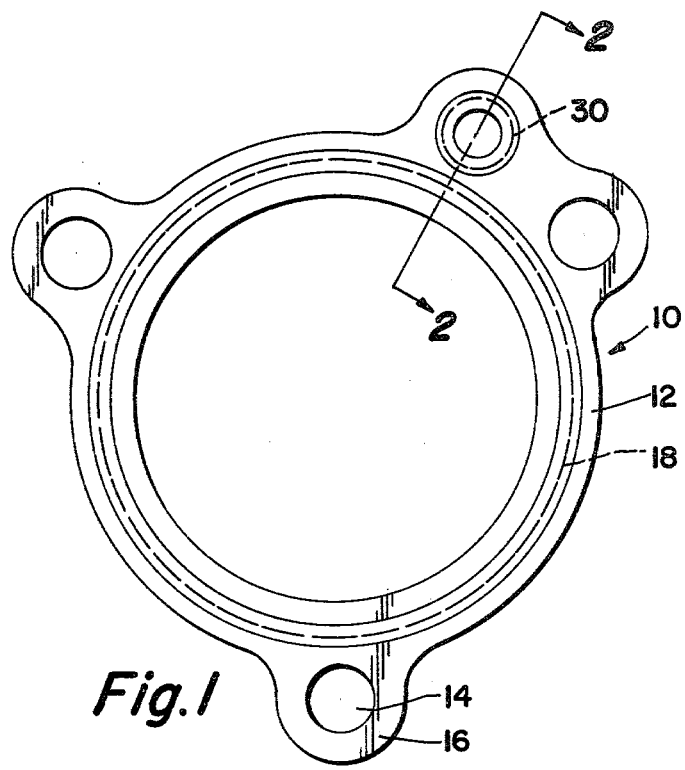
FIG. 1 is an elevation view of the invention of this disclosure showing the radially inwardly extending spacer around the inner periphery of the sealing device.
Figure 2:
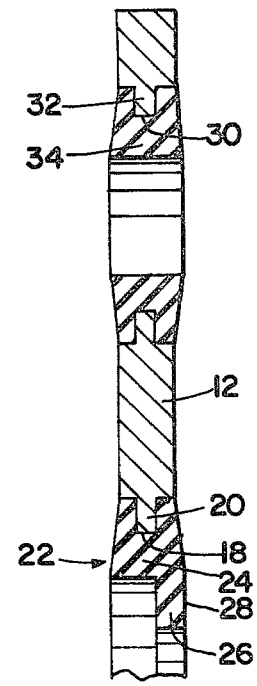
FIG. 2 is an enlarged partial cross-sectional view of a portion of the sealing device taken along lines 2—2 of FIG. 1.

Referring now to the drawings, FIG. 1 shows a seal 10 having a backing plate 12 which is stamped out of any suitable flat sheet metal stock. During the stamping process, one or more apertures 14 may be punched into the flat sheet metal stock so as to be located in tab-like portions 16 provided around the periphery of backing plate 12. An aperture 18 is also punched centrally into the sheet metal stock during the stamping process. After stamping, aperture 18 is coined forming lip 20, as shown in FIG. 2, around the periphery thereof. A layer 22 of soft and pliable elastomeric material such as nitrile or silicone rubber, is then bonded to lip 20 forming the seal configuration shown in FIG. 2.

Figure 3:
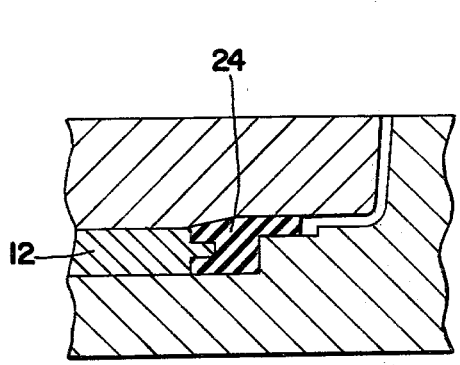
FIG. 3 is an enlarged partial cross-sectional view of illustrating the molding of the elastomeric material to the backing plate.

As shown in FIG. 2, layer 22 of elastomeric material has a main section 24 with an axial thickness slightly greater than the thickness of backing plate 12. Main section 24 also has a radially extending space portion 26 projecting therefrom which is circumferentially continuous and which can be considered to be "flash" since it is elastomeric material that is purposely not constrained in the die during the molding and bonding of layer 22, as shown in FIG. 3. Even though spacer portion 26 is considered to be "flash", it typically has an axial thickness of approximately 0.030 inch making it sufficiently firm for gripping the surface about which it is to be disposed while retaining some flexibility so that it can be easily slipped onto this surface. Spacer portion 26 is offset axially from the center of layer 22 so that one side 28 of spacer portion 26 is adjacent the outer surface of main section 24, as shown in FIG. 2.

After molding, seal 10 is placed on a flat surface so that side 28 of spacer portion 26 is adjacent this flat surface and a portion of the "flash" comprising spacer portion 26 is removed by a punching operation. The positioning of side 28 against a flat surface for the punching operation prevents spacer portion 26 from stretching during this operation, thus insuring that a concentric cut will be made. The inner diameter of spacer portion 26 resulting from this punching operation is slightly smaller than the diameter of the surface about which it is to be disposed insuring that spacer portion 26 will grip this surface.

If any of the apertures 14 are to be used for the passage of fluid, such as a lubricant, those apertures 30 may be coined forming lip 32 around the periphery thereof. A layer 34 of elastomeric material is then bonded to lip 32 on the interior thereof. Such bonding may occur simultaneously with the bonding of layer 22 to lip 20. The thickness of layer 34 is slightly greater than the thickness of backing plate 12 so that when seal 10 is installed between two surfaces to be joined, layer 34 will be compressed between these surfaces forming a positive seal preventing any leakage of the fluid.

Figure 4:
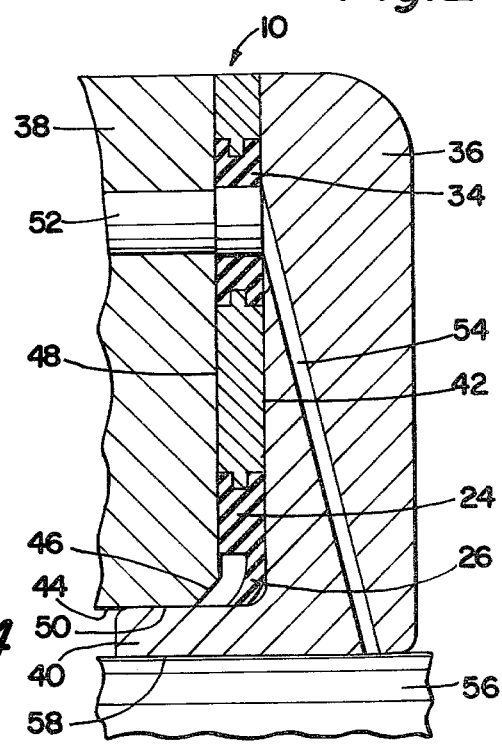
FIG. 4 is a cross-sectional view of the sealing device installed on a highly finished boss which is received in and sealed to a housing.

A typical installation of the seal 10 is shown in FIG. 4 where the seal 10 is used to seal an end cap 36 to a housing 38. End cap 36 has a boss 40 at one end thereof which intersects a transverse surface 42. Housing 38 has a bore 44 provided therein which terminates in a chamfered surface 46 which intersects a transverse surface 48. Boss 40 has a highly finished surface 50 which has a diameter slightly larger than the inner diameter of spacer portion 26. During installation, seal 10 is received on boss 40 and is positioned thereon to contact transverse surface 42. Since highly finished surface 50 has a diameter slightly larger than the inner diameter of spacer position 26, seal 10 will grip surface 50 and the end of spacer portion 26 will move axially in a direction opposite to the axial movement of seal 10. This gripping action, resulting from the relative firmness of spacer portion 26, causes seal 10 to center itself and be radially aligned with respect to boss 40. Even though spacer portion 26 grips surface 50, seal 10 can be moved angularly thereon to obtain angular alignment between any bolt holes in end cap 36 and apertures 14. Thus, seal 10, when installed on surface 50 and properly positioned thereon, is both radially and angularly aligned with respect to boss 40. In addition, since the material used for layer 22 is soft and pliable, the axial movement of the spacer portion 26 on the highly finished surface 50 during installation of the seal 10 and any angular movement thereon during alignment of the seal will not mar or scratch surface 50.

After seal 10 is received and angularly aligned on highly finished surface 50 and contacts transverse surface 42, boss 40 is inserted into bore 44 so that the opposite side of seal 10 contacts transverse surface 48 forming a seal between boss 40 and housing 38. Clamping of end cap 36 on to housing 38 by means of bolts (not shown) through bolt holes (not shown) in end cap 36 and housing 38 and through apertures 14 in seal 10 compresses main section 24 between transverse surfaces 42 and 48 which increases the effectiveness of the resulting seal.

If a lubrication hole 52 is provided in housing 38 and a mating lubrication hole 54 is provided in end cap 36, clamping of end cap 36 on to housing 38 causes compression of layer 34 sealing the passageway between holes 52 and 54. Such lubrication passages usually are used when end cap 36 has a rotating part contained therein, such as a shaft 56 which is received in a bore 58 in end cap 36.

Since spacer portion 26 has an inner diameter which is slightly smaller than the diameter of boss 40, spacer portion 26 firmly grips boss 40 preventing seal 10 from falling off of boss 40 while permitting angular alignment thereon. This gripping action also makes seal 10 self-centering since it causes radial alignment of the seal relative to boss 40. These self-centering and angular alignment features greatly simplify installation of the seal. And lastly, even though spacer portion 26 grips highly finished surface 50, it does not mar or scratch same since it is formed from soft and pliable elastomeric material.

Variations of the present invention will be apparent to those having ordinary skill in the art and the invention is limited only by the spirit and scope of the following claims:

I claim:

1. In combination a sealing device and a part having a generally cylindrical surface, said sealing device comprising a plate having an aperture therethrough, an elastomeric member bonded to said plate at the periphery of said aperture, said elastomeric member being generally planar and having an annular sealing portion with axially separated transverse sealing surfaces concentric with said aperture and having a flexible annular spacer portion and having an opening therethrough in which said cylindrical surface is received, said opening being initially of a smaller diameter than said cylindrical surface and increased in diameter by stretching said spacer portion over said cylindrical surface causing said spacer portion to be in tight contact with said cylindrical surface to position said transverse sealing surfaces concentrically with said cylindrical surface, said support plate having at least one further aperture therein radially outwardly of said first mentioned central aperture, said further aperture being angularly and radially spaced relative to said central aperture and being adapted for communication with a device angularly and radially positioned relative to said cylindrical surface, whereby positioning of said support plate provides an accurate radial registration of said further aperture with the radial position of said device, said support plate being rotatable about said cylindrical surface to achieve angular registration of said further aperture with said device.

2. The sealing device as defined in claim 1 wherein said spacer portion is of less axial thickness than said sealing portion so as to be readily bendable in axial directions but is of sufficient thickness so as to radially center said sealing device on said cylindrical surface and to grip said cylindrical surface with sufficient force to maintain the angular position of said sealing device thereon.

3. The sealing device as defined in claim 1 wherein said sealing portion has a sealing surface on each axial end thereof that projects axially beyond the sides of said plate and said spacer portion is located at one end of said sealing portion.

4. A sealed joint comprising a first part having a bore surrounded by a first transverse end face, a second part having a cylindrical surface received in said bore and having a second transverse end face, a sealing device between said end faces, said sealing device comprising a plate in engagement with said end faces, said plate having an aperture therethrough and having an elastomeric member bonded at the periphery of said aperture, said elastomeric member being an annular sealing portion with axially opposed annular sealing surfaces in sealing engagement with said first and second end faces and having a spacer portion extending radially inwardly of said sealing portion and having an opening therethrough in which said cylindrical surface is received, said spacer portion being of less axial thickness than said sealing portion and being in tight contact with said cylindrical surface so as to radially and angularly position said sealing surfaces relative to said end faces, the opening in said sealing portion having an initial diameter less than the diameter of said cylindrical surface and said initial inner diameter is enlarged by insertion of said cylindrical surface into said opening, said plate having further apertures therein radially outwardly of said first mentioned central aperture, said further apertures being angularly and radially spaced relative to one another and to said central aperture, said further apertures adapted for communication with devices formed in each of said first and second transverse end faces of said first and second parts, respectively, said further apertures being positioned intermediate said end faces, said plate being positioned upon said cylindrical surface providing radial positioning of said further apertures relative to said devices and said plate being angularly positioned to a location whereby said further apertures are in both radial and angular registration with said devices in said end faces.

5. The joint set forth in claim 4 wherein at least one of said further apertures comprises an elastomeric seal at its periphery in engagement with said end faces of said first and second parts to provide a fluid tight engagement about one of said devices in said end faces.

* * * * *